United States Patent
Hou

(10) Patent No.: US 8,940,123 B2
(45) Date of Patent: Jan. 27, 2015

(54) PREPREG TAPE SLITTING APPARATUS AND METHOD

(71) Applicant: Web Industries, Inc., Marlborough, MA (US)

(72) Inventor: Grand Hou, Norcross, GA (US)

(73) Assignee: Web Industries, Inc., Marlborough, MA (US)

( * ) Notice: Subject to any disclaimer, the term of this patent is extended or adjusted under 35 U.S.C. 154(b) by 247 days.

(21) Appl. No.: 13/687,036

(22) Filed: Nov. 28, 2012

(65) Prior Publication Data

US 2013/0284847 A1  Oct. 31, 2013

Related U.S. Application Data

(60) Provisional application No. 61/639,289, filed on Apr. 27, 2012.

(51) Int. Cl.
| | |
|---|---|
| *B32B 38/04* | (2006.01) |
| *B65H 81/06* | (2006.01) |
| *B65H 35/02* | (2006.01) |
| *B65H 18/08* | (2006.01) |
| *B65H 18/00* | (2006.01) |

(52) U.S. Cl.
CPC ............ *B65H 18/08* (2013.01); *B65H 35/02* (2013.01); *B65H 18/00* (2013.01)
USPC ........ 156/259; 156/502; 156/510; 242/443.1; 242/525.5; 242/530.1

(58) Field of Classification Search
USPC ......... 156/253, 256, 259, 271, 157, 502, 510; 242/443.1, 525.5, 530.1
See application file for complete search history.

(56) References Cited

U.S. PATENT DOCUMENTS

| | | | | |
|---|---|---|---|---|
| 3,127,123 | A * | 3/1964 | Bowker et al. | 242/525.5 |
| 3,269,278 | A * | 8/1966 | Olstad | 493/197 |
| 4,256,791 | A * | 3/1981 | Holmstrom et al. | 428/77 |
| 4,336,092 | A * | 6/1982 | Wasserman | 156/269 |
| 4,491,493 | A * | 1/1985 | Eaton | 156/235 |
| 4,621,777 | A * | 11/1986 | O'Connor | 242/160.1 |
| 6,623,586 | B2 * | 9/2003 | Mortellite et al. | 156/201 |
| 6,793,757 | B2 * | 9/2004 | McLaughlin et al. | 156/259 |
| 2008/0149756 | A1 * | 6/2008 | Kuwabara | 242/530.1 |

* cited by examiner

*Primary Examiner* — Mark A Osele
(74) *Attorney, Agent, or Firm* — Edward K. Welch, II; IP&L Solutions

(57) ABSTRACT

A method and apparatus is provided for simultaneously producing wide and narrow slit tape from the same master roll.

23 Claims, 2 Drawing Sheets

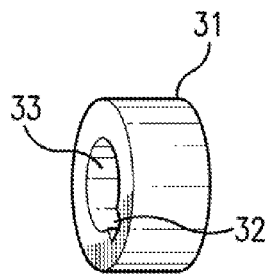
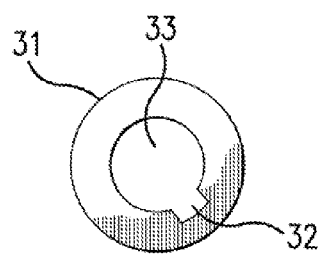
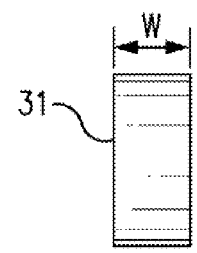
FIG. 3A  FIG. 3B  FIG. 3C
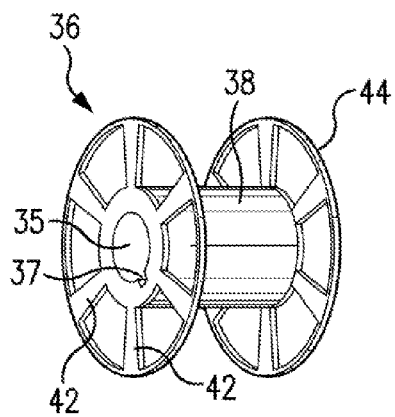
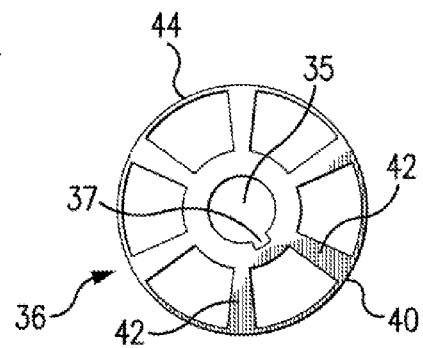
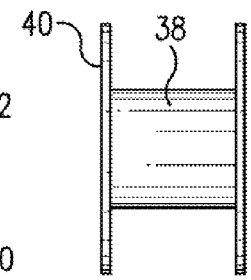
FIG. 4A  FIG. 4B  FIG. 4C
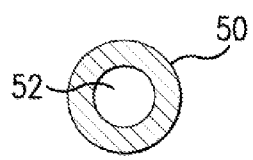
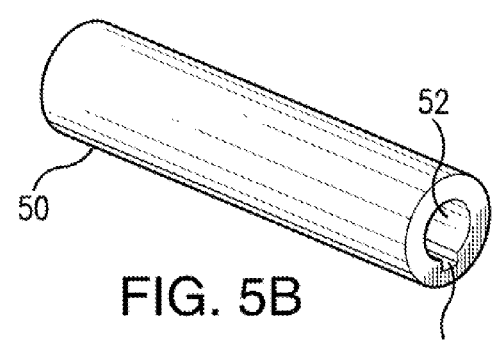
FIG. 5A  FIG. 5B
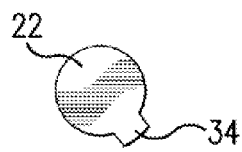
FIG. 6

PREPREG TAPE SLITTING APPARATUS AND METHOD

The present application claims the benefit of U.S. Provisional Patent Application No. 61/639,289 filed Apr. 27, 2012, the contents of which are hereby incorporated herein by reference in their entirety.

FIELD OF THE INVENTION

The present application is directed to a method for slitting continuous sheets of prepreg composite materials to concurrently form wide and narrow prepreg slit tape and the apparatus therefore. Specifically, the teachings of the present application allows for the simultaneous formation of narrow width, spooled prepreg slit tape and wide width pancake wound prepreg slit tape from the same master roll of prepreg material.

BACKGROUND

Advances in composite technology have had a marked impact on product design and engineering and, ultimately, manufacture. Early methods involving hand lay-up of fibrous materials and sheets with the subsequent impregnation of the laid up materials and, subsequently, the laying up of pre-impregnated fibrous sheets and mats followed by compression forming and curing saw rapid adoption and exploitation of these composite materials and technologies in many fields. However, while useful for many applications, the slow methodical build-up of the layers of materials is very labor intensive, involves the use of hazardous chemicals and, more importantly, oftentimes very unstable materials and/or materials having limited working time. Thus, while a marked advance in the industry, their applications were still limited.

Subsequent advances in composite materials and technology led to continuous manufacturing techniques. Most notably, filament winding where a continuous tow of certain fibrous materials were pulled though a bath of a curable material to impregnate the same with the curable material, wound about a mandrel to form the desired part, preferably with some measure of immediate cure to attain a green state so as to maintain its shape and fiber placement and subsequently fully cured. However, these operations were very slow and time consuming owing to the narrow width of the tow. More importantly, these processes were very capital intensive as the whole of the operation, from preparation of the curable composition to wetting of the tow of fiber material to the formation of the part itself, all had to be performed in the same room.

Continued advances in both manufacturing and materials technology led to the ability to prepare rolls of prepreg materials, especially epoxy impregnated fibrous sheets, wherein the base sheet material was most typically formed of unidirectional, parallel fibers running the length of the roll. These rolls were typically of sufficient length, like the rolls of tow in filament winding applications, that continuous manufacturing methods could be developed with the prepreg materials being formed at the prepreg manufacturer, cooled to prevent premature curing, shipped to the site of use and warmed and subsequently used to produce the desired products. No longer was it necessary for the ultimate product manufacturer to invest capital and overhead or employee technical personnel to make the prepreg materials. Cost advantages and a focus on centered expertise (e.g., prepreg manufactures concentrated on the chemistry and manufacture of the prepreg and the product manufacturers concentrated on the layup process) proved beneficial all around.

Early on, prepreg strips or sheet materials were manufactured in standard widths that were used to make the commercial products. This was acceptable in the early going as many applications had very similar demands and requirements, e.g., baseball bats, golf clubs, hockey sticks, lacrosse sticks and the like can all be made with generally the same width of slit tape, largely because the demands are similar and the need for differentiation less. Even if not optimal, these stock tapes were used nonetheless as making many different widths, especially making custom widths, was cost prohibitive. The capital requirements are quite large and incapable of supporting a large differentiation of products. Consequently, the full adoption of this technology in higher demanding applications was limited if the width of the tapes needed were inconsistent with the widths that were available.

More recently, technology has evolved and new expertise and processing capabilities have been developed whereby a broad array of tape widths were made possible through the slitting of stock master rolls. Wide tapes could now be made for applications having large planar or curved planar surfaces while narrow width tapes could be made for more intricate or curved parts. Though this technology allowed for the use of prepreg tapes in the manufacture of many different products whose demands, especially physical demands, required specific properties which are affected by, in part, the width of the prepreg tape, the expansion of the use of prepreg tapes into the production of aircraft parts has been one of the, if not the, major driver for recent technology innovation and advancement. While one might think that the demands for aircraft production would be fairly constant across the field of aircraft components, nothing could be further from reality. Each component must endure its own, most often unique, environment and its respective physical demands and stresses. For example a tail fin will have marked different requirements than a wing or a fuselage portion. Combined with the tight tolerances of aircraft parts, it has become more and more apparent that a plethora of widths of slit tape are needed with differences in width for slit tape from one application to the another being on the order of just fractions of an inch, and minor fractions at that. Tolerances are orders of magnitude smaller, with tolerance requirements being on the order of thousandths of an inch. Further confounding the process in aircraft production is the finding that certain parts require slit tapes off two or more different widths. Thus, custom slitting has been a major achievement in the use of slit tow in composite structure manufacture.

Notwithstanding its benefits, the adaptation of slit tape, especially for aircraft production, is not without its shortcomings. Most notably, owing to the high cost of the machinery and apparatus to make master rolls, master rolls still tend to be produced in standard widths. With custom width slitting of these master rolls, the likelihood that the width of the master roll will be a whole multiple of the width of the slit tape desired is rather low. Consequently, the ability to slit to custom widths comes with the disadvantage of an increase in processing waste, a costly event given the high costs of prepreg materials. The only alternative is to adjust the slit tape widths to allow for full consumption of the stock roll; however, this may mean that the optimal width for the given end use part may not be used. While this may not be an issue for an internal, non-structural component of an aircraft, it is simply not tolerable for a structural member or a fuselage application.

Additionally, as noted, higher demand applications, especially in aircraft production, are now found to require the simultaneous, alternating and/or sequential application or placement of slit tapes of two or more widths. Most often this involves the use of a wide slit tape, one that must or is preferably wound on a spool or reel whereby the resultant stock material looks more like a disc or pancake and is often called a pancake coil. The second slit tape required is quite often, if not most often, at the other end of the width scale, being an inch or less, which widths are not capable of being, or are preferably not, wound on a spool but must be wound about a spindle in a spiraling or helix type pattern (transverse winding), much like a package of twine which is typically wound on a dowel or the like.

Given the different demands and requirements in producing narrow and wide width slit tapes, until the present teachings, it has been the standard in the industry that the two different slit tapes be formed on two different apparatus, each configured for the specific tape width desired. Alternatively, they have been produced sequentially using, for the most part, the same equipment but changing out the slitter element to slit the different widths as well as the winding apparatus. The first option of two dedicated lines is the most convenient and has the least impact on processing downtime, but has the added cost of capital and operation expense in order to install, support and operate two complete lines. The second option is less costly, especially in terms of capital commitment and space requirements, but has significant cost impact in terms of production time and, at the time of change over, manpower. Whereas the process employing two separate apparatus can run continuously, with minimal interruption but to change the master roll and off load the spooled/spindled slit tape; the latter requires considerable downtime to switch out the slitting element for the second tape width as well as to switch out the winding station and apparatus and reconnect the remainder of the slitting apparatus to the new winding station and apparatus, prime the system and get it up and running for the different product. All of this adds considerable costs to what is already a very expensive process and product as well as raises concerns for the time such materials remain on the processing floor, exposed to ambient conditions, particularly given their instability and need for storage under significantly reduced temperatures.

Additionally, although less of a concern in non-aerospace applications, another factor that comes into play with applications requiring two or more widths of slit tape is the fact that each width of slit tape comes from a different master roll which may be of the same lot or of an entirely different lot: perhaps even a master roll from a different prepreg manufacturing plant altogether. Sure all master rolls are manufactured to certain specifications, but there are tolerances in each specification and the specifications only address key attributes and/or properties of the master roll material. However, different master rolls, even from the same production lot, may experience different environments/conditions that have an impact on their ultimate performance, cure characteristics, properties and the like.

Again, in most applications this is not of concern, but in high tech aerospace and aircraft applications, it can be a considerable problem. Even an ever so slight difference in cure characteristics as between the wide tape and the narrow tape, especially at the interface of the two tapes, could have an adverse effect on the overall performance of that part. In this respect, consider the fact that the fuselage of the SST aircraft expanded several feet in length during supersonic flight. Materials compatibility and matched coefficients of thermal expansion were critical to the ultimate success of that aircraft. Thus, the use of parts where an incompatibility or weakness in the bond between one slit tape tow and another in the production of that part could play a role in the ultimate performance and life of that part.

While rigid product inventory control and management can reduce the likelihood that two disparate slit tapes will be used to make the same part, it may not always be possible. For example, the original quantity of stock master rolls may not allow for the proper ratio of tape widths. Furthermore, even if such management efforts were put in place, it still cannot address the fact that the two master rolls may yet have differences not readily apparent to the fabricator and/or inherent in the curable matrix owing to different handling during shipment and storage, e.g., one may have been left in the open longer than the other and heated to a different temperature than the other. As active, curable compositions, the properties of the matrix resin of the prepreg will change with time and temperature: a factor which, as noted above, comes into play the longer the rolls are left exposed to ambient temperatures as with extended or delayed slitting processing times.

Thus, there remains a need in the industry for a commercially cost-effective method for the production of wide and narrow width slit prepreg tape. Specifically, there remains a need for a simple, cost-effective, labor non-intensive method for the production of wide and narrow width prepreg slit tape with minimal waste and minimal processing time.

In following, there remains a need in the industry for an apparatus for use in a method that allows for a commercially cost-effective, particularly from a capital equipment perspective, method for the production of wide and narrow width slit prepreg tape.

There remains a need in the industry for a production method for wide and narrow slit prepreg tape which assures minimal, if any, differences in composition, treatment, handlings, etc. of the master stock rolls from which each is produced. Most especially, there is a need for slit tape production which does not require, or minimally requires, strict inventory management controls and oversight.

SUMMARY

According to the present teachings there is provided a method for the simultaneous production of both wide and narrow width prepreg slit tape from the same master roll of prepreg material. Specifically, there is a provided a method for the simultaneous production of wide and narrow width prepreg tape which method involves
  a) feeding a continuous sheet of prepreg material through a slitting apparatus whose slitting or cutting elements are configured to provide for the production of both wide and narrow width slit tape,
  b) separating each tow of slit tape longitudinally along each slit made by the slitting or cutting elements;
  c) guiding and aligning each tow of wide width tape to a spool element and each tow of narrow width tape to a spindle element; and
  d) winding the wide width slit tape on the spool element, each wind directly imposed upon the prior wind so as to form a disc or pancake coil of the slit tape and, simultaneously, winding the narrow width slit tape on the spindle element in a spiral or helical pattern, traversing back and forth along the length of the spindle element.

This method may and, most preferably does include the step of inserting a liner material between the slit tape as it is wound on the spool or spindle, as appropriate, so that the liner separates the newly laid slit tape from the underlying slit tape as it is wound. Finally, the method may, and preferably does, involve the step of cutting the slit tape at the spool or spindle, as appropriate, once the desired length of material is wound thereon. Thereafter, a new spool element, spindle element, or both, as appropriate, is placed on the winding site and the cut end of the tape fed thereto to begin winding on the new spool or spindle element.

Most preferably the method is employed on large master rolls of continuous prepreg sheet materials. These rolls are placed in an unwinding station and unwound so as to provide a continuous feed of the prepreg sheet material to the slitting or cutting apparatus. Optionally, though preferably, the method also involves the step of splicing the tail end of one master roll to the lead end of a second master roll at a point intermediate the unwinding station and the slitting or cutting apparatus. Splicing allows for the continuous or near continuous conversion or slitting of prepreg sheet materials into slit tape. Splicing may also be used to remove and replace one master roll with another where the first, following commencement of conversion, is found to be defective, out-of-specification, or otherwise undesired.

According to a second aspect of the present teachings there is provided a prepreg slitting apparatus which is capable of simultaneously slitting a continuous sheet of prepreg material into wide and narrow width prepreg slit tape and simultaneously winding the wide slit tape in a spool manner and the narrow width slit tape in a spindle or helix manner (transverse winding). Preferably the apparatus is configured to accept master rolls of the prepreg sheet material. Optionally, though preferably, the apparatus is also capable of splicing the tail end of one master roll to the lead end of a second master roll prior to the slitting operation.

More specifically, there is provided a prepreg slitting apparatus comprising, in order:

a) an unwinding station capable of receiving and holding one or more master rolls of prepreg sheet material;

b) optionally, a splicing station capable of splicing one end of a prepreg sheet material to another end of prepreg sheet material, preferably, the tail end of one master roll to the lead end of a second master roll;

c) a slitting station capable of and configured to slit or cut a prepreg sheet material into a plurality of slit tape tows of at least two distinct widths, a narrow width and a wide width; and d) a winding station having a wide slit tape winding section and a narrow slit tape winding section; wherein i) the wide slit tape winding section comprises at least one axel adapted to receive at least one spool element on which the wide slit tape is to be wound in a coil fashion, and ii) a narrow slit tape winding section comprising one or more spindle winders on which the narrow slit tape is to be wound in a reciprocating spiral or helical pattern, i.e., transverse wound.

Preferably, the wide slit tape winding section comprises one or two axels, each axel having a plurality of spool elements releasably, though securely, seated thereon and, most preferably, in a spaced relationship and a drive means for rotating the axel about its longitudinal or central axis. Though not necessary, the presence of a second axel containing the spool elements allows for a quicker change-out of the spool elements once the spools are full. The spool elements may be mere cylinders whose width is the same as or substantially the same as the width of the slit tape to be wound thereon. Alternatively, the spool elements may be in the form of reels, as in a reel to reel tape, having side walls extending from the spool core to guide and help keep the slit tape aligned as it is being wound.

The narrow slit tape winding section comprises a plurality of spindle winders each comprising an axel on which a spindle core is to be securely positioned for receiving the narrow slit tape tow and one or more drive means for rotating each spindle axel about its longitudinal or central axis. The spindle winders will also have associated therewith alignment and tensioning elements for properly laying the narrow slit tape on the spindle in a reciprocating helical or spiral manner.

Finally, the winding stations will also have a plurality of liner feed and alignment apparatus for matching a liner to the slit tape prior to or concurrent with its winding so that a strip of liner is present between each successive layer of slit tap as it is would about its spool or spindle element, as appropriate. The liner feed apparatus generally comprises a resistance axel which allows for the free rotation of the axel but with resistance, i.e., as the slit tape and liner are wound, the winding motion pulls the liner from the spool of liner material mounted on the resistance axel.

The apparatus according to the present teaching optionally, and typically, further comprises a plurality of guide, roller, tensioning and/or positioning elements intermediate the slitting station and the winders for directing each tow of slit tape from the slitting station to its proper winding station and, ultimately, its intended spool or spindle element and, preferably, while maintaining a constant tension on the slit tape as it is wound. Although these or certain of these elements may be associated with the winding of the wide slit tape, they are most especially associated with the winding of the narrow slit tapes.

BRIEF DESCRIPTION OF THE DRAWINGS

The accompanying drawings which form a part of the specification are to be read in conjunction therewith. Like reference numerals are employed to indicate like parts in the various views.

FIGS. 3A, 3B and 3C show an elevated, perspective view, a face on view, and a side view of a spool element for the winding of a wide slit tape tow.

FIGS. 4A, 4B and 4C show an elevated perspective view, a face on view and a side view of a reel type spool for the winding of a wide slit tape tow.

FIGS. 5A and 5B shows a face on view and an elevated perspective view of a spindle for the winding of a narrow slit tape tow.

FIG. 6 shows a cross-sectional view of a spool axel having a key extension.

DETAILED DESCRIPTION

Figure 1:
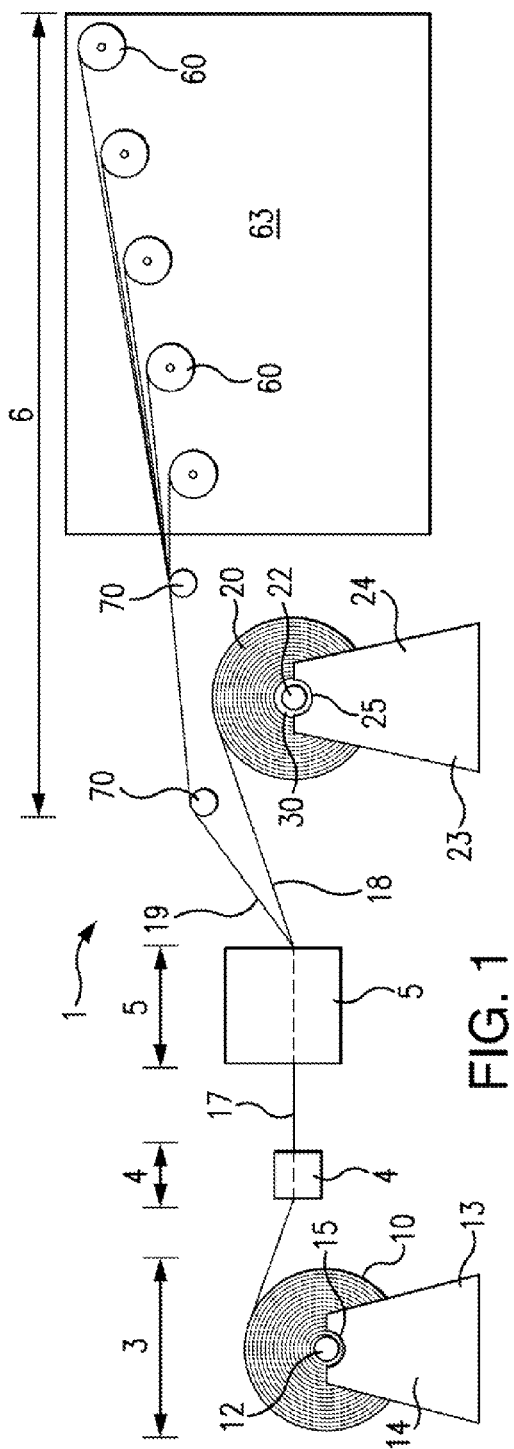
FIG. 1 is a schematic side view of a prepreg slitting apparatus with dual wide and narrow slit tape tow production capabilities in accordance with a preferred embodiment of the present teaching.

As used herein, the term "continuous" when used in reference to the prepreg sheet material is not meant to imply that the sheet of prepreg material is never ending: although the possibility exists if one continuously splices one supply of sheet material to another. Rather, this term is intended to refer to long lengths of prepreg sheet material, especially long lengths as are standard in the industry and supplied in master roll form. Typically, these will have lengths of at least about 25 meters up to about 1500 meters or more. Additionally, although specific reference herein is made to prepreg sheet materials of unidirectional fibers impregnated with curable epoxy resins, it is understood that the present teachings are not so limited. Indeed, the present teachings are equally applicable to other prepreg sheet materials, including those wherein the fibrous component is woven or non-woven fabric as well as those wherein the matrix resin is any of number of curable matrix resins including, but not limited to epoxies, cyanate esters, bismaleimides, phenolics, polyimides, and the like.

According to the present teaching there is provided a method for the simultaneous production of wide and narrow width prepreg slit tape from a continuous sheet of prepreg material, preferably from a master roll of prepreg sheet material. Those skilled in the art will readily appreciate the limits as to which widths of slit tape are amenable to pancake winding and which must be wound via a transverse winding. Generally speaking, the former is employed with slit tape of no less than 2 inches, preferably no less than 3 inches in width; whereas the latter is generally employed with slit tape of no greater than 3 inches, preferably no greater than 2 inches in width. As will be noted below, each entails a different winding process with the final product being in a different physical form. The former, the wide slit tape, undergoes a spool winding process where the tape is wound about a spool element, one layer directly on top of the other. This results in a coil or pancake of the prepreg slit tape. The narrow slit tape does not have sufficient structure and integrity to allow for such a winding and must be spindle or transverse wound. Here the narrow slit tape is wound about a cylindrical spindle element in a spiral or helical manner repetitiously moving from one end of the spindle to the other, gradually building one layer atop another along the length of the spindle element. Because there is no clear point at which the width of the slit tape dictates one method over the other, there is some overlap in the ranges of widths that are accommodated by each method. However, it is to be appreciated that as the width approaches the extreme end of the range for one method, it is probably best to use the other method. Of course other factors come into play in choosing the method to use including the integrity, stiffness and pliability of the prepreg material itself.

Turning back to the present teaching, there is provided a method for the simultaneous production of spooled and spindled prepreg slit tape which method comprises:
 a) feeding a continuous sheet of prepreg material through a slitting apparatus whose slitting or cutting elements are configured to provide for the production of both wide and narrow width slit tape,
 b) separating each tow of slit tape longitudinally along each slit made by the slitting or cutting elements;
 c) guiding and aligning each tow of wide width tape to a spool element and each tow of narrow width tape to a spindle element: and
 d) winding the wide width slit tape on the spool element, each wind directly imposed upon the prior wind so as to form a disc or pancake coil of the slit tape and, simultaneously, winding the narrow width slit tape on the spindle element in a spiral or helical pattern, traversing back and forth along the length of the spindle element.

Finally, the method may, and preferably does, include the step of:
 e) either removing the spools and/or spindles once the master roll is consumed or, preferably, cutting the slit tape at the spool or spindle, as appropriate, once the desired length of material is wound thereon.

In the case of the spools, it is typical that all the spools would be changed out at the same time since each would have the same length of tape. This is facilitated by the fact that the spools are typically situated on just one or two axels which can be readily removed, spools and all, and replaced with a second axel or plurality of axels having empty spools situated thereon. In the case of the spindles, these too may be changed out at the same time (which may or may not be the same time that the spools are changed out) or, depending upon the number thereof, may be changed out in sequence without having to stop the slitting process. The former requires that the process be stopped while all the spindles are removed and replaced. However, the latter contemplates an apparatus having one or more extra spindle winders whereby the spindles are changed out sequentially. Specifically, as the apparatus is running, the slit tape tow to a spindle winder to be changed out is cut and the free slit tape end of the tow affixed to a free spindle winder and the spindle winder engaged to initiate winding. Meanwhile, the spindle on the spindle winder whose tow was cut is removed and replace with a new spindle element. That spindle winder is now ready for reuse when another spindle is to be changed out.

Most preferably, the winding process also involves the insertion of a liner material between the slit tape tow as it is wound on the spool or spindle, as appropriate, so that the liner separates the newly laid slit tape from the underlying slit tape over which it is wound as it is being wound. This step involves mating each slit tape tow with a correspondingly wide, if not wider, strip of liner material at the spool or spindle element as the winding occurs.

As noted above, the method is applied to continuous sheets of prepreg materials. Preferably, the prepreg materials employed in the practice of the present method are in the form of large master or parent rolls of the continuous prepreg sheet material. In the practice of the claimed process, these rolls are placed in an unwinding station and unwound so as to provide a continuous feed of the prepreg sheet material to the slitting or cutting apparatus.

Optionally, though preferably, the method also involves the step of splicing the tail end of one master roll to the lead end of a second master roll at a point intermediate the unwinding station and the slitting or cutting apparatus. Splicing allows for the continuous or near continuous conversion or slitting of prepreg sheet materials into slit tape as well as the change out of one prepreg sheet material for another. Splicing may also be used to remove and replace one master roll with another where the first master roll, following commencement of its conversion, is found to be defective, out-of-specification, or otherwise undesired.

Where the apparatus is to be set off-line for any extended period of time which would adversely affect any in-process prepreg materials, the ability to splice also provides the ability to introduce a blank sheet, which may be the same material as the liner, into the apparatus whereby the blank material is spliced into the prepreg material and allowed to pass through the apparatus until slit tape strips of the blank material reach each of the spool and spindle elements. At this point all of the spools and spindles having prepreg slit tape wound thereon are removed and the system shut down with the blank material in place throughout the apparatus. In this respect, the apparatus is "primed" to begin slitting prepreg materials again. All one need do is splice in a prepreg sheet material to the tail end of the blank material and run the apparatus. The blank material will, then, pull the prepreg material through the apparatus and one is off and running.

Having described the method in the most general of terms, it will now be described in conjunction the apparatus shown in FIGS. 1 and 2. This is but one possible configuration. Those skilled in the art, having the benefit of the present teachings, will readily appreciate other configurations and alignments of equipment that may be used in the practice of the present teaching as well as other specific pieces of equipment which are capable of performing the same task, though, perhaps, in a different way, that may be employed in place of the specific type of equipment mentioned herein. For example, while this specification speaks of knives as the cutting elements in the slitting station, other cutting elements and/or apparatus, such as a cold laser, micro-knives, diamond knives, etc., may be used as well. Similarly, as noted in more detail below, the spool for the wide slit tape may be nothing more than a hollow cylindrical element. Alternatively, it may take the form of a reel, much like those of reel-to-reel tapes or with a spool hub or core and sidewalls.

Also, it is to be noted that the equipment and elements or components thereof employed in the practice of the present method are all known and commercially available or readily attainable. However, the specific alignment, combination and/or configuration of the equipment and their elements or components are not known and are new. For example, while cutting elements are known, the specific alignment of the cutting elements for simultaneously slitting wide and narrow width slit tape is not known. Similarly, the design and configuration of the winding stations, which merge the elements of both the spool winding and spindle winding processes, are not known. Other adjustments need be made to properly align the slit tape tows for each winding operation; however, those skilled in the art with the benefit of the present teachings will readily appreciate and be able to undertake the necessary modifications to be made.

Figure 2:
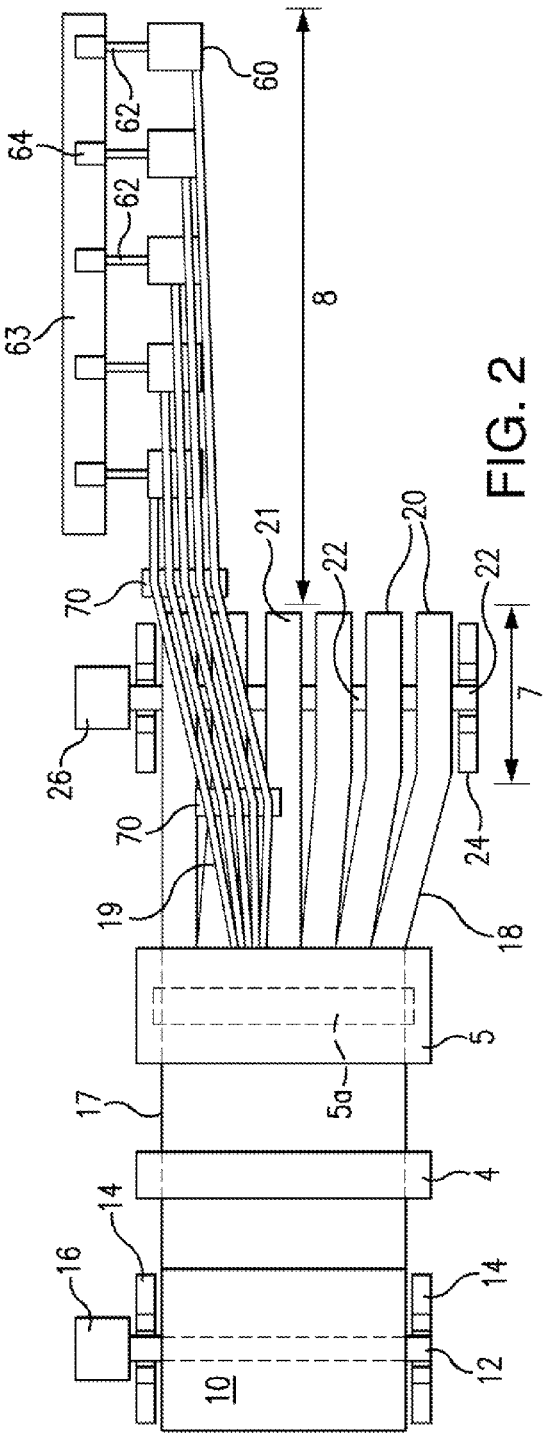
FIG. 2 is a schematic top view of the apparatus of FIG. 1.

Turning now to the figures, FIGS. 1 and 2 show top and side schematic views of an apparatus 1 capable of performing the method of the present teachings. The apparatus as shown includes four key stations, an unwind station 3, a splicing station 4, a slitting station 5 and a winding station 6 comprising a spool winding section 7 and a spindle winding section 8. Each station and section will be described in greater detail below: though absolute detail is not necessary as most all of the elements are well known and commercially available.

As shown in FIGS. 1 and 2, the unwind station 3 comprises a support structure 13 having opposing sidewalls 14 spaced from one another by a distance that will accommodate a typical master roll of prepreg sheet material 10, end-to-end between the side walls. Each side wall 14 includes a cradle or like structure 15 adapted to receive and allow rotation therein of an axel 12 about which the prepreg sheet material 10 is wound or upon which a mandrel or core element about which the prepreg material is wound is mounted. Preferably, and as shown, the axel is directly or indirectly attached to or engaged with a drive motor 16 which rotates the axel 12 about its axis to facilitate the unwinding of the prepreg sheet material from the master roll.

The splicing station 4 follows the unwind station and is most often a part of or combined with the unwind station. The splicing station typically comprises heating and compression elements (not shown) to facilitate the splicing of one end of one master roll to an end of another master roll. The splicing station may, and preferably does, also incorporate cutting or slitting means or elements for cutting across the width of the prepreg sheet material. The latter may be necessary to provide a clean cut to the tail end and/or leading end of a prepreg master roll, to excise a master roll for replacement with a new master roll, or to insert a blank roll, as discussed above.

When not conducting a splicing operation, the splicing station is merely a pass-through station with the structure of the splicing station doing nothing more than, perhaps, helping with the proper alignment of the sheet material as it enters the slitting station 5. Specifically, those elements of the splicing station associated with the splicing operation or process itself are typically withdrawn or pulled back from the pathway of the prepreg sheet material and only advanced to be in contact with the prepreg sheet material therewith when a splice is to be made. Splicing techniques and their associated elements and apparatus are well known and commercially available from multiple sources.

Following the splicing station, if present, is the slitting station 5. The slitting station comprises the slitting or cutting elements 5a (shown in dashed lines in FIG. 2) and, typically, a number of elements and components (not shown) for moving the prepreg sheet material to, through and/or past the slitting and cutting elements. With the exception of the slitting or cutting tool or element itself, all of the components of the slitting station are well known and commercially available. Although the slitting and cutting elements as configured for use in the practice of the present method are not commercially available, they are constructed of commercially available slitting and cutting elements that are readily adapted to slit a prepreg sheet material into a plurality of slit tape tows of at least two distinct widths, one of which is wide enough that the winding thereof may be attained on a spool winder and the other of which is of such narrow width that it is to be wound on a spindle type spool winder. Suitable slitting elements are well known in the art and include precision, high strength blades, cool lasers, micro-knives, and the like.

In accordance with the present teachings, the slitting or cutting elements of the slitting station are configured and spaced to form both the desired wide slit tape tows and the desired narrow slit tape tows in widths and the ratio needed or desired. (The latter refers to, a production process that requires one narrow slit tape for every wide slit tape.) Knowing the width of the master roll, the width of the wide and narrow slit tapes needed or desired, and the overall ratio of wide to narrow slit tape needed, one can then calculate the optimum ratio of wide to narrow slit tapes to be formed and, hence, the proper configuration or the spacing for the slitting or cutting elements of the slitter 5a. In any event, the maximum width of the waste material arising from the slitting operation is generally less than that of two narrow slit tape tows, even if one discards the outer edges of the master roll, more generally less than that of a single narrow slit tape tow. In contrast, current state of the art processes which sequentially produce the wide slit tape and the narrow slit tape generate an amount of waste prepreg material that could well exceed the combination of a) nearly twice the amount of in a single strip of the wide slit tape, and b) nearly twice the amount of prepreg material in a single strip of narrow slit tape. This is especially so if one discards each outer edge. Regardless, one skilled in the art and having the benefit of the present teachings can readily configure the slitting process to maximize slit tape and minimize waster far more efficiently than is allowed by the current state of the art processes.

In following, it is to be appreciated that for aircraft production, tolerances in terms of variation in the widths of the slit tapes over their specifications are extremely low, on the order of thousands of an inch, perhaps 3 or 5 thousands of an inch (0.003" and 0.005", respectively). Thus, from the standpoint of aircraft production, there no or little opportunity to play with the widths of the slit tape to maximize output beyond what each slitting process allows for a given width of master sheet. In following, current processes inherently result in far greater waste than is likely or, even possible, with the improved and novel process described herein.

Considering the configuration of the slitting or cutting elements themselves, as shown in FIGS. 1 and 2, the narrow width tapes, and hence the corresponding slitting elements, are bundled near the center region of the slitter 5a, again as shown by the dashed lines in the slitting station 5. However, any or essentially any configuration could be used. Nevertheless, it is to be appreciated that this configuration, while effective, requires that many of the wide slit tape tows be angled as they extend from the slitting station to the winding station. While this is generally not problematic, it is also to be appreciated that the slit tape itself becomes more rigid and stiff as the width increases. Thus, where alignment of the tape is to be turned to allow for a straight on winding on the spools, concerns arise with respect to twisting of the tape and/or a failure of the successive winding layers to directly overlay one another. Thus, it is preferred that that slitting or cutting elements be configured to allow for alternating slit tapes of narrow and wide widths or some similar iteration. Preferably, the slitting or cutting elements are set such that the sequence of narrow and wide width slit tapes alternates as evenly as possible given the ratio of narrow to wide slit tape tows needed or to be produced. For example, as noted, the configuration in FIGS. 1 and 2 shows an alignment of narrow (N) and wide (W) slit tapes as follows: WWNNNNNWWWW. Alternating the two, e.g., WNWNWNWNWNW, will space each wide tape between narrow tape widths, thus, minimizing the need to alter the path of the wide slit tape tows to the corresponding roller in the winding station. Again, it is most preferable if the slitter is configured to allow the wide tape tows to extend perpendicularly, relative to the slitter, to the winding elements upon which they are to be wound.

Of course, it is to be appreciated that the foregoing proposed iterations of narrow and wide tape configurations are, for the most part, illustrative since most commercial master rolls are on the order of 60 inches or more in width. Hence, the number of slit tape tows formed from any given master roll will likely be several multiples of the 10 tows suggested above. Regardless, the point is that the alignment of the slitting or cutting elements is preferably such that path of the wide slit tape tows from the slitter to the winding station, especially the spool element, is essentially linear, as shown by spool 21 in FIG. 2.

Although not shown, those skilled in the art will readily appreciate that the apparatus of the slitting station will also comprise a number of roller and guide elements to facilitate the passage of the prepreg materials through the slitter, which facilitation includes speed of passage, alignment of the sheet vis-à-vis the blades or cutting elements, and the stabilization/positioning of the tape while being slit. Typically, the roller element of the slitting station controls the overall speed of the prepreg sheet through the slitter and, hence, the overall speed of the apparatus as a whole. The apparatus may also have a plurality of pins or guide elements after the slitting elements which help to ensure clean separation between the newly formed slit tape tows. Finally, the slitting station may also include or have associated therewith or thereafter a monitoring capability which performs measurements, continuously or at timed sequences, on the slit tape tows to ensure that they are in specification.

The final station of the apparatus of FIGS. 1 and 2 is the winding station 6. This station comprises two distinct sections, the spool winding section 7 for the wide slit tape and the spindle winding section 8 for the narrow slit tape. Again, the elements of each are well known and commercially available, but their combination and simultaneous use is not.

In the embodiment shown in FIGS. 1 and 2, the spool winding section 7 comprises a support structure 23 having opposing sidewalls 24 spaced from one another by a distance that will accommodate an axel 22 having or capable of having a plurality of spools 30 situated thereon. While FIGS. 1 and 2 depict the spools in a spaced relationship, it is to be appreciated that the spools may aligned side-by-side or have minimal spacing between them. Although not evident from FIGS. 1 and 2: though clear from the spools of FIGS. 3A, 3B, 4A, 4B and 4C, as discussed below, each spool has a key or notch or like element 32 that coincides with a coordinating key element 34 on each axel 22, as shown in FIG. 6. This configuration of the axel readily allows the spool elements to be slid on and off the axel, along the axial axis, yet serves to essentially lock each spool in place, at least with respect to axial rotation. Thus, the spools turn only when the axel turns.

As shown in FIGS. 3A, 3B and 3C, the spools 31 may be simple cylindrical elements having a central bore or hole 33 through which the axel passes and whose width W corresponds to or is slightly wider than the width of the tape to be wound thereon. As noted, the central bore 33 has associated therewith a key or notch 32 which coincides with a corresponding key extension 34 on the axel 22, as shown in FIG. 6. Alternatively, as shown in FIGS. 4A, 4B and 4C, the spools may take the form of reels 36 comprising the same core element 38, corresponding to the spool of FIG. 3A and opposing side walls 40 extending circumferentially from each end of the core spool element. Though those skilled in the art will appreciate that any configuration of side walls are suitable, as shown in FIGS. 4A, 4B and 4C, the sidewall may comprise a plurality of spokes 42 terminating in a circumferential ring 44. This configuration creates a cradle for the tape as it is wound about the spool core 38.

As noted above, each spool has a key or other element which secures the spool to the axel; at least insofar as axial rotation is concerned. In this manner, the spools only turn as the axel rotates. Various locking or key mechanisms are known and can be applied. For the sake of demonstration, the embodiments in FIGS. 3A, 3B, 3C, 4A, 4B, 4C and 6 employ a key 34 extending axially along the length of the axel 22. A corresponding notch or slot is present in the central bore or hole 33,35 of the spool 31 and reels 36, respectively.

Turning back to the spool winding section 7, as mentioned, there is a support structure 23 comprising opposing side walls 24, each side wall having a cradle 25 adapted to receive and allow rotation therein of the axel 22. The axel is attached, directly or indirectly, to a drive motor 26 which rotates the axel about its axis to allow the spools to take up the wide slit tape 18 as it is produced. Preferably, the motor maintains a positive pull on the slit tape tows in order to ensure proper alignment and a smooth winding of the slit tape as it is wound about the spool 30. However, it is to be appreciated that this spool winding motor is generally not the rate determining motor for the overall process; rather, that is most typically the role of the roller and feed elements association with the slitting station, as discussed above.

The winding station 6 also comprises a spindle winding section 8 comprising a plurality of spindle winders 60 mounted on a support structure 63 for winding the narrow slit tape 19 tows. Each spindle winder comprises a spindle axel 62 which is, directly or indirectly, attached to or engaged with a drive motor 64 for rotating the axels about their axes. Each motor may be associated with one or more axels; but are, in any event, coordinated to run simultaneously, though not necessarily at the same speed. Specifically, unless the spindles are changed out and wound at the same time, the rate of winding of each spindle axel must be independent so as to allow for different rates of rotation based on the amount of tape already wound on the spindle. Typically, and preferably, each spindle winder has its own drive motor as shown in FIG. 2.

Like the spool axel motor 26, the spindle axel drive motors 64 associated with the spindle winders are preferably passive, meaning they maintain a modest tension on the tape being wound but are not actually pulling the slit tape through the apparatus. Again, as mentioned, the overall speed of the system is generally dictated by the speed of the prepreg sheet material passing through the slitting station.

Each spindle axel 62 is configured to receive a spindle element 50, as more clearly shown in FIGS. 5A and 5B. The spindle element freely slides on, in the direction of the axel axis, the spindle axel 62 and is prevented from freely rotating about the axel: though it rotates when the axel rotates. Safeties can be built into the spindle elements and spindle axels whereby the spindle element will be allowed to rotate freely about the spindle axis or, at least, is disengaged from rotating concurrent with the rotation of the spindle axel should the tension in the slit tape tow exceed a certain point which could cause the tape to stretch and/or break. Alternatively, the spindle winders and spindles may have associated therewith a key mechanism 53 or like mechanism as discussed above with respect to the spool winders, which prevents the free rotation of the spindles about the spindle axel.

The spindle elements 50 are elongated cylinders having a central bore or hole 52 extending its length and through which the spindle axel passes. These spindle elements typically have a length, as measured along its cylinder axis, that is considerably longer than the width of the spool elements 31. Generally, the length of the spindle elements 50 are from about 6 to about 24 inches; though shorter and longer elements can be used and may be used depending upon the machine used to ultimately apply the tape in the product production process.

The winding station 6 also has associated with it a plurality of pathway elements including guide and alignment elements, rollers, tension regulators and the like, all of which are known and employed in the art, to properly guide and align the slit tape tows for placement on the spindles, while maintaining a select tension, for winding. While such pathway elements may be employed in the winding of the wide slit tape tows on the spool elements, they are most typically associated and necessary, for proper alignment and winding of the narrow slit tape tows on the spindle winders. This is so not just for properly directing the narrow slit tape tow from the slitting station to the respective spindle winder but also for providing the necessary end-to-end spiral or helical winding, i.e., transverse winding, of the slit tape tow on the spindle itself. Exemplary pathway elements are show as pathway elements 70 in FIGS. 1 and 2. Again, these pathway elements are well known and in current use in slitting apparatus. Those skilled in the art, having the benefit of the present teachings will readily appreciated the number, configuration, alignment, etc. of the pathway elements for each section of the winding station to enable and, most preferably to optimize performance.

Finally, the apparatus may and preferably, especially in the case of prepreg materials, does comprise a liner supply and associated interliner apparatus for placing a strip of liner material between successive windings of each slit tape prepreg tow as it is being wound so that no prepreg tape lies directly upon another. The liner (also known as interliner) materials and apparatus are well known and customarily used in the industry. Though customarily configured for either spool winding or spindle winding, those skilled in the art, having the benefit of the present teachings will readily appreciate that the two configurations can be readily incorporated into the apparatus a shown in FIGS. 1 and 2 without the need for further adaptation or alteration from that configuration in which they are currently used in their respective winding operations. For this reason, and to maintain the simplicity of the figures, the liner and liner apparatus are not shown in FIGS. 1 and 2 nor further described herein.

Practice of the present method merely requires the insertion of a master roll 10 of the prepreg sheet materials into the unwinding station. One then begins to unwind the master roll passing the lead end of the prepreg sheet material 17 though the splicing station and on to the slitting station. The prepreg sheet is then fed through the slitter element 5a and exits the same as a plurality of wide 18 and narrow 19 slit tape tows. The end of each wide slit tape tow is then guided to a spool and fixed thereto. Concurrently, each end of the narrow slit tape tow is guided to each spindle winder and attached thereto. In both instances, the end of a liner strip is concurrently attached to the spool and spindle, respectively, so that once formal running of the apparatus is under way, each slit tape wind will be separated from the underlying wind.

The apparatus is then run, allowing the whole or, as appropriate, a portion of the master roll to be fed through the slitting station. Slitting will continue until the desired length of slit tape tow is produced. Should the master roll be fully consumed, the lead end of a second master roll is spliced to the tail end of the first and slitting resumed. At any point in time the process may be stopped to remove the spools and/or spindles or, as mentioned above, the system can be configured to allow for continued slitting with minimal, if any, downtime, to switch in new spools and/or spindles. In any event, once the slitting of the prepreg materials is completed, rather than allow the last of the prepreg tows to pass through the apparatus, it is preferred to splice in a blank sheet material, e.g., a roll of liner material, which then follows the tail end of the prepreg material through the apparatus. Once all of the prepreg material is wound, the system can then be shut down and the spools and spindles doffed and replaced or left in place and replaced once a new processing begins and the slit tape reaches the spool or spindle. In this manner, the system is primed for its next round of slitting. To commence slitting anew, all one need do is splice a new master roll to blank material and begin processing. This avoids the need to re-feed each slit tape tow through the system: a time consuming effort.

The method and apparatus of the present teachings have many unanticipated benefits. As noted at the outset, the present method enables one to produce wide and narrow slit tape without the need for multiple production lines and without the need for long interruptions in production to allow a production line to be reconfigured to switch between the different slit tape widths. However, in large scale commercial production facilities, there are oftentimes multiple production lines. Thus, these two issues are not presented. Still, those production lines also benefit from the adoption of the present teachings and apparatus. Specifically, as note previously, the present process and apparatus allows for both wide and narrow slit tapes to be produced from the same master rolls, avoiding concerns of incompatibility or differences, however slight, between the two tape widths which are commingled during the part production process. Additionally, the ability to produce both wide and narrow slit tapes simultaneously on the same production line allows one to maximize consumption of the master roll materials, avoiding excess waste, especially in those lines dedicated to the production of wide slit tape. Furthermore, by proper configuration and alternation of wide and narrow slitting elements in the slitting station, one is able to lessen, if not avoid altogether, the need to redirect or realign the wide slit tape for proper alignment as it enters the spooling winder. It is also believed that configuring the slitters so that wide slit tape tows and narrow slit tape tows are produced in an alternating or somewhat alternating fashion provides improved stability to the slitting process: the domains of wider slit tape providing a more stable substrate as the narrow slit tapes are slit alongside them.

While the foregoing method and apparatus have been described, more or less, in terms of a stand-alone apparatus and process to be performed using master rolls, the present teachings are also applicable to the incorporation of the present apparatus and process, in-line into the manufacturing process for the prepreg materials themselves. Here, rather than winding the prepreg sheet material into a master roll once firm enough, the prepreg sheet material is fed directing into the slitter station of the present teachings.

Furthermore, though not described above, those skilled in the art will readily recognize that both in-line produced prepreg sheet material as well as master rolls of prepreg sheet materials have a backing upon which the prepreg sheet material has been produced. Accordingly, the apparatus of the present teachings further comprises elements for removing the backing material prior to the slitting of the prepreg sheet material. Again, these elements are well known in the art and commercially available.

Although the method and apparatus of the present specification have been described with respect to specific embodiments and figures, it should be appreciated that the present teachings are not limited thereto and other embodiments utilizing the concepts expressed herein are intended and contemplated without departing from the scope of the present teaching. Thus true scope of the present teachings is defined by the claimed elements and any and all modifications, variations, or equivalents that fall within the spirit and scope of the underlying principles set forth herein.

I claim:

1. A method for the simultaneous production of wide and narrow width prepreg tape which method comprises
    a) feeding a continuous sheet of prepreg material through a slitting apparatus whose slitting or cutting elements are configured to provide for the production of both wide and narrow width slit tape,
    b) separating each tow of slit tape longitudinally along each slit made by the slitting or cutting elements;
    c) guiding and aligning each tow of wide width tape to a spool element and each tow of narrow width tape to a spindle type spool element; and
    d) winding the wide width slit tape on the spool element, each wind directly imposed upon the prior wind so as to form a disc or pancake coil of the slit tape and, simultaneously, winding the narrow width slit tape on the spindle element in a spiral or helical pattern, traversing back and forth along the length of the spindle element; wherein a wide prepreg tape is characterized as having a width and integrity that allows the slit tape to be wound around a spool or reel, one layer directly overlaying the prior. to form a stable disc or pancake-like shape and a narrow width slit tape is characterized as being capable of being wound in an end-to-end spiral or helical pattern on a spindle.

2. The method of claim 1 wherein the process further comprises the step of inserting a liner material between each successive winding of the slit tape material as the same is being wound.

3. The method of claim 1 wherein the process further comprises the step of configuring the slitting elements of the slitter apparatus so as to optimize the number of wide and narrow slit tape tows for the given width of the continuous sheet of prepreg material based upon widths of the wide and narrow slit tapes and the ratio of wide to narrow slit tape desired.

4. The method of claim 1 wherein the slitting elements are configured so that the slitting elements for the wide slit tape tows have been aligned with the spools therefore to avoid angling or twisting of the wide tape tows between the slitter and the spool.

5. The method of claim 1 wherein the slitting elements are configured so that at least one narrow slit tape tow is produced between each pair of wide slit tape tows.

6. The method of claim 1 further comprising the removal of a backing material from the prepreg sheet material prior to slitting.

7. The method of claim 1 wherein the wide width slit tape has a width of at least 2 inches and the narrow width slit tape has width of no greater than 2 inches.

8. The method of claim 1 wherein the wide with slit tape has a width of at least 2 inches and the narrow width slit tape has a width of no greater than 1 inch.

9. A prepreg slitting apparatus comprising, in order:
    a) a slitting station capable of and configured to slit or cut a prepreg sheet material into a plurality of slit tape tows of at least two distinct widths, a narrow width and a wide width; and
    b) a winding station having a wide slit tape winding section and a narrow slit tape winding section; wherein i) the wide slit tape winding section comprises at least one axle adapted to receive at least one spool element on which the wide slit tape is to be wound in a coil fashion, and ii) a narrow slit tape winding section comprising one or more spindle type winders on which the narrow slit tape is to be transverse wound on an appropriate spindle or like element; wherein a wide prepreg tape is characterized as having a width and integrity that allows the slit tape to be wound around a spool or reel. one layer directly overlaying the prior, to form a stable disc or pancake-like shape and a narrow width slit tape is characterized as being ca able of being wound in an end-to-end spiral or helical pattern on a spindle.

10. The apparatus of claim 9 wherein the apparatus is adapted to be incorporated into a prepreg manufacturing process so as to allow for the in-line manufacture and slitting of the prepreg materials.

11. The apparatus of claim 9 wherein the prepreg sheet material is produced by a manufacturing process which employs a backing material and the apparatus further comprises elements for removing the backing material prior to slitting.

12. The apparatus of claim 9 which further comprises elements for inserting a liner material between successive windings of the slit tape tows as they are being wound.

13. The apparatus of claim 9 wherein the wide width slit tape has a width of at least 2 inches and the narrow width slit tape has width of no greater than 2 inches.

14. The apparatus of claim 9 wherein the wide with slit tape has a width of at least 2 inches and the narrow width slit tape has a width of no greater than 1 inch.

15. A prepreg sheet slitting apparatus comprising, in order:
    a) an unwinding station capable of receiving and holding one or more master rolls of prepreg sheet material;
    b) optionally, a splicing station capable of splicing one end of a prepreg sheet material to the end of another sheet material.
    c) a slitting station capable of and configured to slit or cut a prepreg sheet material into a plurality of slit tape tows of at least two distinct widths, a narrow width and a wide width; and
    d) a winding station having a wide slit tape winding section and a narrow slit tape winding section; wherein i) the wide slit tape winding section comprises at least one axle adapted to receive at least one spool element on which the wide slit tape is to be wound in a coil fashion, and ii) a narrow slit tape winding section comprising one or more spindle type winders on which the narrow slit tape is to be transverse wound; wherein a wide prepreg tape is characterized as having a width and integrity that allows the slit tape to be wound around a spool or reel, one layer directly overlaying the prior, to form a stable disc or pancake-like shape and a narrow width slit tape is characterized as being capable of being wound in an end-to-end spiral or helical pattern on a spindle.

16. The slitting apparatus of claim 15 wherein the splicing station is present and is capable of splicing the end of one roll of prepreg sheet material to the end of a second prepreg sheet material.

17. The slitting apparatus of claim 15 wherein the unwinding station further comprises elements for removing a backing material from the prepreg sheet material prior to the slitting station.

18. The slitting apparatus of claim 15 further comprising elements for inserting a liner material between successive windings of the slit tape as they are being wound.

19. The slitting apparatus of claim 15 wherein the slitting apparatus comprises slitting elements which have been configured so as to optimize the number of wide and narrow slit tape tows for the given width of the continuous sheet of prepreg material based upon the widths of the wide and narrow slit tape and the ratio of wide to narrow slit tape desired.

20. The slitting apparatus of claim 15 wherein the slitting apparatus comprises slitting elements which have been configured so that the slitting elements for the wide slit tape tows have been aligned with the spools therefore to avoid angling or twisting of the wide tape tows between the slitter and the spool.

21. The slitting apparatus of claim 15 wherein the slitting apparatus comprises slitting elements which have been configured so that at least one narrow slit tape tow is produced between each pair of wide slit tape tows.

22. The apparatus of claim 15 wherein the wide width slit tape has a width of at least 2 inches and the narrow width slit tape has width of no greater than 2 inches.

23. The apparatus of claim 15 wherein the wide with slit tape has a width of at least 2 inches and the narrow width slit tape has a width of no greater than 1 inch.

\* \* \* \* \*